INVENTORS
HAROLD MOREINES
GUNTER J. GESSNER
BY
AGENT

INVENTORS
HAROLD MOREINES
GUNTER J. GESSNER

INVENTORS
HAROLD MOREINES
GUNTER J. GESSNER

BY
AGENT

United States Patent Office 3,473,151
Patented Oct. 14, 1969

3,473,151
REDUNDANT PULSE MONITORING NETWORK
Harold Moreines, Springfield, and Gunter Jerry Gessner, Maywood, N.J., assignors to The Bendix Corporation, a corporation of Delaware
Filed Apr. 24, 1967, Ser. No. 633,286
Int. Cl. H04q 1/18
U.S. Cl. 340—167          10 Claims

ABSTRACT OF THE DISCLOSURE

A fail safe monitoring network including means for comparing redundant signals and for providing a square wave pulse and in which a timing gate pulse is generated in response to the square wave pulse. When the redundant signals correspond within predetermined limits, the square wave pulse goes through a transition from one logic level to another during the timing gate pulse and is reproduced for actuating an alarm device to an "off" condition. When the redundant signals differ significantly the square wave pulse transition occurs outside of the timing gate pulse whereby a constant level output is provided for actuating the alarm device to an "on" condition.

CROSS REFERENCE TO RELATED APPLICATIONS

The device of the present invention is an improvement over the monitoring device disclosed and claimed in copending U.S. application Ser. No. 545,027, filed Apr. 25, 1966 by Harold Moreines and Gunter J. Gessner and assigned to The Bendix Corporation, assignee of the present invention.

BACKGROUND OF THE INVENTION

Field of the invention

The present invention relates to signal monitoring in redundant computing and control systems and particularly to a fail safe monitor for comparing direct current or demodulated alternating current input signals and for providing a discrete output change when the difference between the input signals exceeds predetermined limits. More particularly, the invention relates to means for reproducing an input pulse when said input pulse goes through a transition from one logic level to another during a gating pulse provided by said means.

Description of the prior art

Monitor networks now known in the art such as the monitor network disclosed and claimed in the aforenoted copending U.S. application Ser. No. 545,027 include means for comparing redundant input signals and for providing a pulse at a predetermined frequency when the input signals correspond and the monitor is operating properly. The pulse frequency varies when the difference between the input signals exceeds a predetermined limit or when a system malfunction occurs. When the pulses are provided at a frequency other than the predetermined frequency conventional inductance-capacitance band pass filters attenuate the pulses whereby an alarm device is actuated to an "on" condition. Filters of this type lack sharp tuning characteristics and do not have the capability of operating on pulsed data at low power levels so as to facilitate the use of microcircuits.

SUMMARY OF THE INVENTION

The novel monitor network of the present invention includes first means for providing a first pulse having a predetermined pulse width. The first pulse is summed with one of a pair of redundant input signals and a differential amplifier provides a signal corresponding to the difference between the summed signal and the other redundant input signal. A capacitor is charged by the difference signal to a predetermined threshold level for triggering second means whereby a second pulse is provided. Means are provided for affecting a third pulse in response to the second pulse and for reproducing the second pulse as long as said second pulse goes through a transition during the third pulse thereby indicating proper operation of the monitored system, and which reproduced second pulse actuates an alarm device to an "off" condition. When the transition of the second pulse occurs outside of the third pulse indicating a system malfunction, the last mentioned means provides a constant level output which actuates the alarm device to an "on" condition. The second pulse or, alternately, the reproduced second pulse, is fed back to the first means to sustain the operation of the monitor whereby the transition of the second pulse occurs during the third pulse until a malfunction occurs.

One object of this invention is to provide a monitor network for a control system providing redundant input signals, and which monitor network includes means for indicating when the difference between the redundant input signals exceeds predetermined limits.

Another object of this invention is to include in a monitor network of the type described means for comparing the redundant input signals and for providing a pulse output, and means for reproducing the pulse output when the redundant input signals correspond within predetermined limits for actuating an alarm device to an "off" condition.

Another object of the invention is to include in a monitor network of the type described a filter which is responsive to the pulse output for providing a gating pulse. When the pulse output goes through a transition from one level to another during the gating pulse, the pulse output is reproduced by the filter and when the transition occurs outside of the gating pulse the filter provides a constant level output for actuating the alarm device to an "on" condition.

Another object of this invention is to provide a filter of the type described which is capable of operating on input pulses at low power levels whereby the use of microcircuitry is facilitated.

Another object of this invention is to include the filter in a feedback loop for sustaining operation of the monitor when the pulse output is reproduced.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
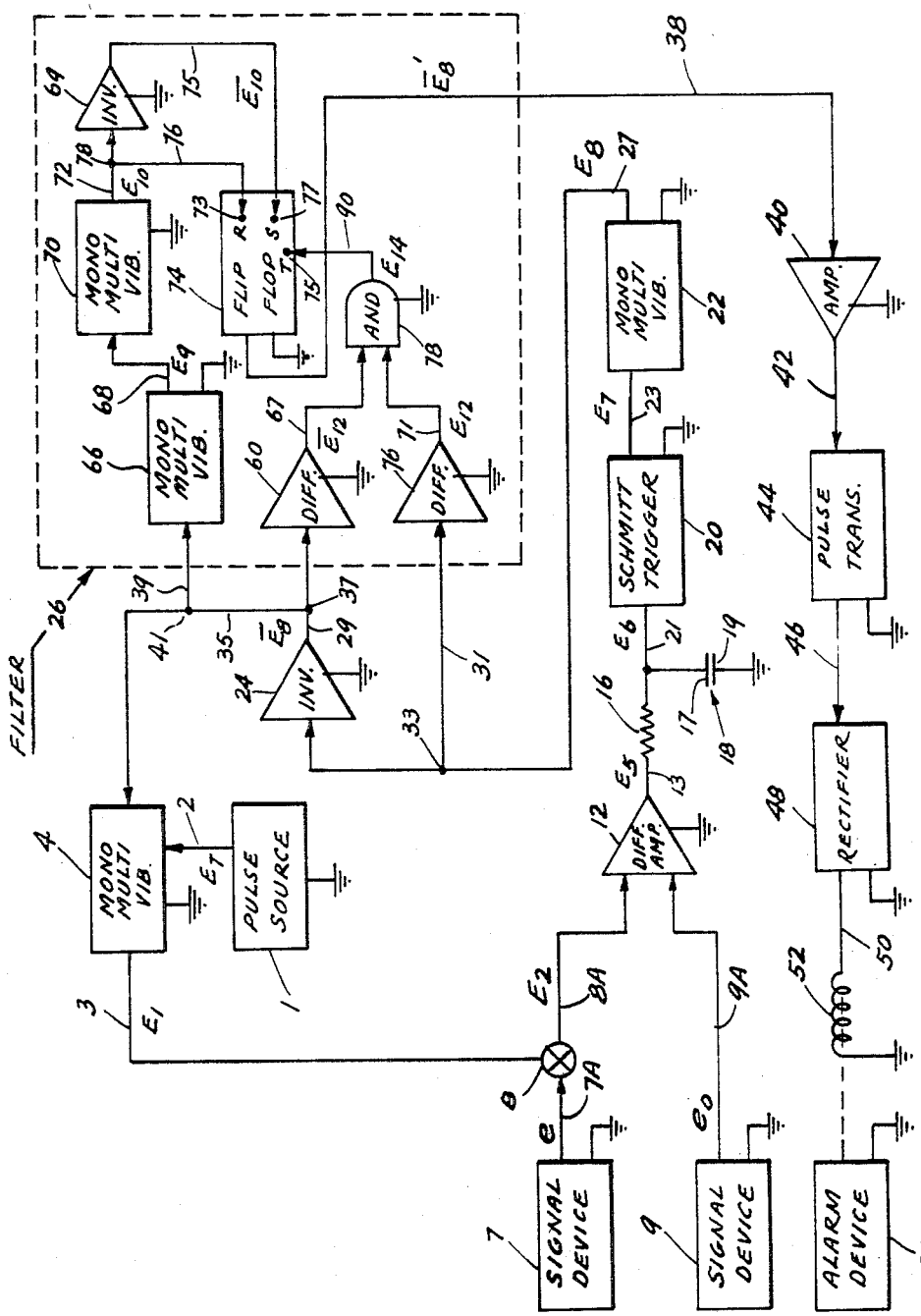
FIGURE 1 is an electrical schematic diagram showing a monitor network constructed in accordance with the invention and including means for providing a pulse $E_8$ and a filter 26 affected by the pulse $E_8$.
Figure 2:
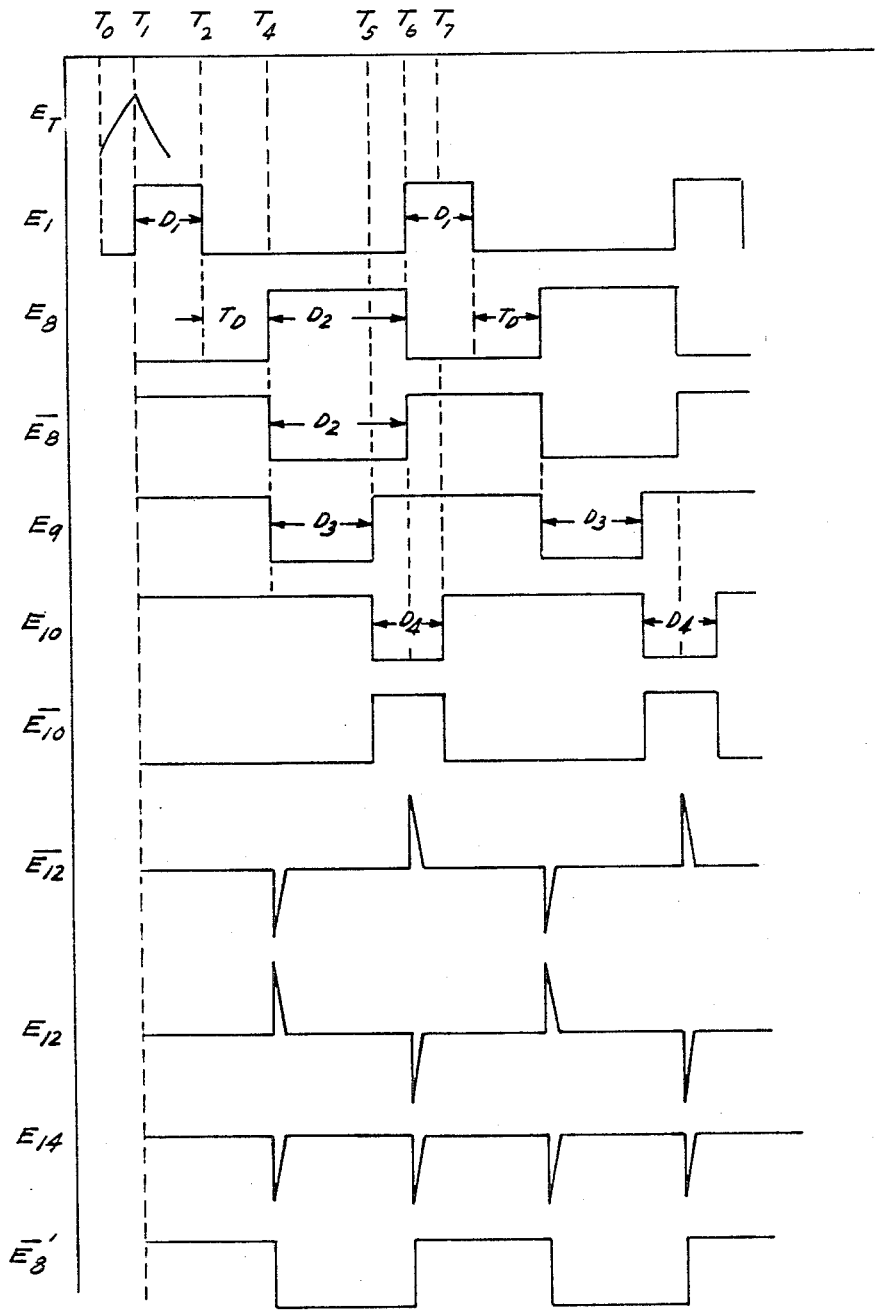
FIGURE 2 is a graphical illustration showing pulse waveforms provided during normal operation of the monitor network and when the pulse $E_8$ and its complementary pulse $\overline{E}_8$ go through a transition from one logic level to another during a timing gate pulse $E_{10}$ provided by the filter 26.

At a time designated as $T_0$ in the graphical representation of FIGURE 2, an oscillating cycle is started by a pule $E_T$ having a positive saw toothed waveform, as shown in FIGURE 2, and applied through a conductor 2 from a pulse source designated by the numeral 1 in FIGURE 1 to a monostable multivibrator 4. Monostable multivibrator 4 is of the type generally shown and described at page 200, Basic Theory and Application of Transistors, Department of the Army, 1959, and has a stable and an unstable state. Monostable multivibrator 4 is initially in its stable state and is triggered to its unstable state by the pulse $E_T$ applied through the conductor 2. Monostable multivibrator 4 remains in the unstable state for an interval $T_1$ and $T_2$, shown in the graphical representation of FIGURE 2, reverting at the time $T_2$ to its stable state after a predetermined delay period and providing at an output conductor 3 a positive pulse $E_1$ having a pulse width $D_1$ as shown in FIGURE 2, determined by the interval between the times $T_1$ and $T_2$. The positive pulse $E_1$ from monostable multivibrator 4 is applied, through the conductor 3 to a summation means 8 at which the positive pulse $E_1$ is algebraically summed with a control signal $e$ applied at a conductor 7A, and the resultant summation signal $E_2$ applied to the conductor 8A.

The system monitored by the device of the present invention may be a dual channel aircraft control system including a signal device 7 for providing at the output conductor 7A the direct current or demodulated alternating current aircraft control signal $e$, and including a signal device 9 for providing at an output conductor 9A a direct current or demodulated alternating current signal $e_0$ corresponding to signal $e$. When the aircraft control system is operating properly, signal $e$ from signal device 7 and signal $e_0$ from signal device 9 are of the same polarity and differ in amplitude within predetermined limits. When a system malfunction occurs, that is, if the difference between the direct current or demodulated alternating current signals $e$ and $e_0$ exceeds the predetermined limit, or if the signals $e$ and $e_0$ are of opposite polarities, the monitoring device of the present invention brings into operation an alarm device 32, as hereinafter described.

Signal $e$ from signal device 7 is applied through the output conductor 7A to the summation means 8, and combined therewith the positive pulse $E_1$ applied from monostable multivibrator 4 through the output conductor 3. Summation means 8, provides at the output conductor 8A the summation signal $E_2$. Summation signal $E_2$ from summation means 8 is applied through the output conductor $8a$ to a differential amplifier 12 and signal $e_0$ from signal device 9 is applied through the output conductor 9A to the differential amplifier 12. Differential amplifier 12 algebraically subtracts signal $e_0$ from signal $E_2$ and provides at the time $T_2$, shown in FIGURE 2 a difference signal $E_5$ at an output conductor 13.

The pulse $E_5$ from the differential amplifier 12 is applied, through the output conductor 13 and a resistor 16, to a plate 17 of a capacitor 18, while an opposite plate 19 of the capacitor 18 is connected to ground. Capacitor 18 charges to the level of pulse $E_5$ during a time interval $T_2$ to $T_4$ otherwise shown as $T_D$ in FIGURE 2 to provide at the time $T_4$ a triangular shaped ramp $E_6$ at a conductor 21. Ramp $E_6$ is applied through the conductor 21 to a Schmitt trigger 20. Schmitt trigger 20 is of the type such as that generally shown and described at pages 431– 434 of Electronics for Scientists, Malmstadt, et al., Benjamin, 1963, being in a "disabled" state when the ramp $E_6$ is below a predetermined threshold level and triggered to its "enabled" state when the ramp $E_6$ equals or exceeds the threshold level, thereupon providing at an output conductor 23 a pulse $E_7$. he Schmitt trigger 20 remains in the "enabled" state, acting to provide the output pulse $E_7$ until capacitor 18 is discharged below the threshold level of Schmitt trigger 20, Schmitt trigger 20 thereupon reverting to the "disabled" state terminating the output pulse $E_7$.

The pulse $E_7$ is applied through the conductor 23 to a monostable multivibrator 22 which is of a type similar to monostable multivibrator 4, being initially in its stable state and triggered at the time $T_4$ shown in FIGURE 2 by the pulse $E_7$ to its unstable state. Monostable multivibrator 22 remains in the unstable state for the time $T_4$ to $T_6$, otherwise shown as $D_2$ in FIGURE 2 so as to provide at an output conductor 27 a pulse $E_8$ having a waveform as shown in FIGURE 2. Thus, the monostable multivibrator 22 reverts to its stable state at time $T_6$ to complete an oscillating cycle of the monitoring device.

Pulse $E_8$ is applied through the output conductor 27 to an inverter 24, and which inverter 24 provides at an output conductor 29 a complementary pulse $\overline{E}_8$ having a waveform as shown in FIGURE 2. The pulse $E_8$ is applied through the output conductor 27 to a conductor 31 leading from a point 33 on the conductor 27 to a filter 26. The pulse $\overline{E}_8$ provided by the inverter 24 is applied through the conductor 29 to the filter 26, and through a conductor 35 joining the conductor 29 at a point 37 to a conductor 39 leading from a point 41 on the conductor 35 to the filter 26.

Filter 26 is affected by the pulses $E_8$ and $\overline{E}_8$ so that if said pulses go through a transition from one logic to another at the times $T_4$ and $T_6$ shown in FIGURE 2, thus indicating proper operation of the control system, filter 26 provides, in a manner which will be hereinafter explained, a pulse $\overline{E}_8{}'$ at an output conductor 38, and said pulse $\overline{E}_8{}'$ being a reproduction of the pulse $\overline{E}_8$ and having a waveform, as shown in FIGURE 2. The pulse $\overline{E}_8{}'$ is applied through the output conductor 38 to an amplifier 40. The amplified pulse at an output conductor 42 of the amplifier 40 is applied to a pulse transformer 44 which provides a pulse at an output conductor 46, and which pulse is applied through the output conductor 46 to a rectifier 48. The rectified pulse at an output conductor 50 of the rectifier 48 energizes a relay 52 whereupon the alarm device 32 is actuated to an "off" state.

Figure 3:
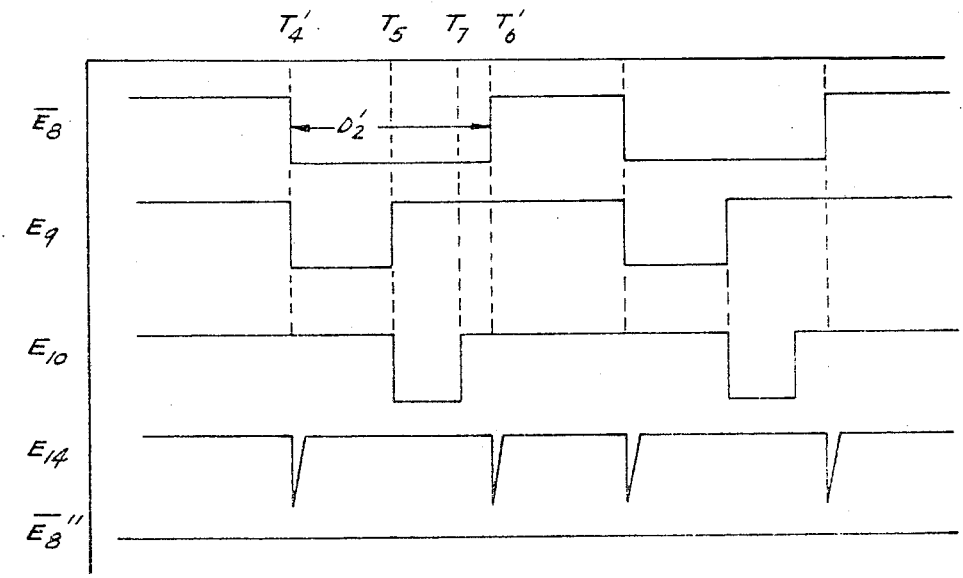
FIGURE 3 is a graphical illustration showing pulse waveforms provided during an abnormal operating condition of the monitor network and when the pulse $\overline{E}_8$ goes through a transition outside of the pulse $E_{10}$.
Figure 4:
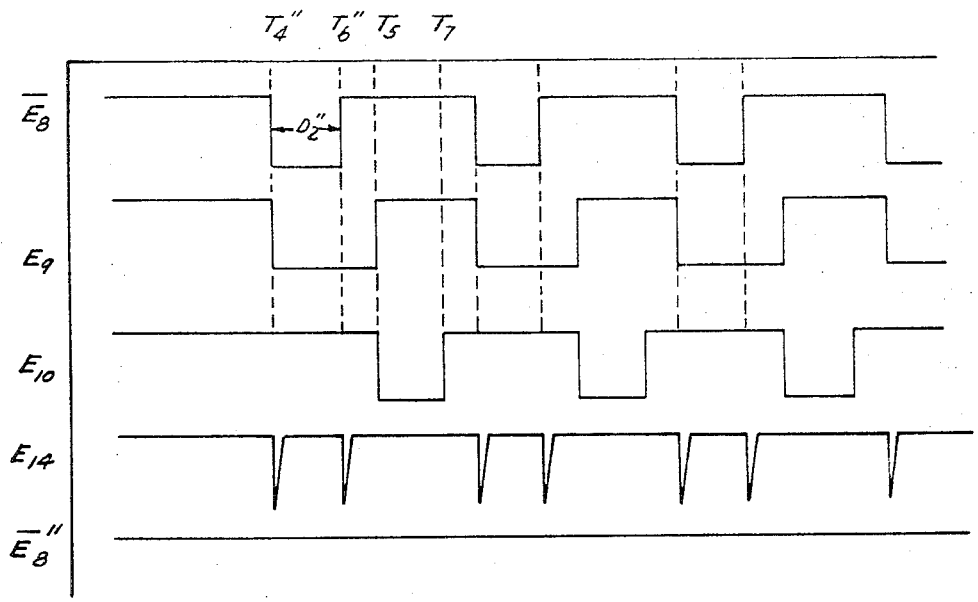
FIGURE 4 is a graphical illustration showing pulse waveforms provided during another abnormal operating condition of the monitor network and when the pulse $\overline{E}_8$ goes through a transition outside of the pulse $E_{10}$.

When the pulses $E_8$ and $\overline{E}_8$ go through a transition at times other than the times $T_4$ and $T_6$ shown in FIGURE 2, the output $\overline{E}_8{}'$ of the filter 26 is provided at a constant level as shown in FIGURES 3 and 4, and said output is thus ineffective to energize the relay 52 whereupon the alarm device 30 is actuated to an "on" state indicating a system malfunction.

The pulse $\overline{E}_8$ from the inverter 24 is applied through the conductor 29 and the conductor 35 leading from the point 37 on the conductor 29 to the monostable multivibrator 4 so as to trigger the monostable multivibrator 4 to its unstable state. When the pulse $\overline{E}_8$ goes through its high to low transition at the time $T_6$, shown in FIGURE 2, monostable multivibrator 4 is triggered to its unstable state at the time $T_6$ and the operation of the monitor is sustained so as to provide at the output conductor 27 of the monostable multivibrator 22 the pulse $E_8$, as long as the system is operating properly and there is no monitor malfunction.

The filter 26 is affected by the pulses $E_8$ and $\overline{E}_8$ so as to generate a timing gate pulse $E_{10}$ having a waveform as shown in FIGURES 2, 3 and 4, and during which timing gate pulse $E_{10}$ the transition of the pulses $E_8$ and $\overline{E}_8$ must occur in order for the filter 26 to provide the output $\overline{E}_8'$ at the alternate high and low levels whereby said output $\overline{E}_8$ is reproduced and the reproduced output is effective for energizing the relay 52. During normal operation of the system, and in the absence of monitor failures, the transition of pulses $E_8$ and $\overline{E}_8$, occurs during the aforenoted timing gate pulse $E_{10}$, but when the system is operating improperly or a monitor failure occurs, the transition of pulses $E_8$ and $\overline{E}_8$ occurs outside of the timing gate pulse $E_{10}$ and the output $\overline{E}_8'$ is provided at a constant high level, as shown in FIGURES 3 and 4, which is ineffective for energizing the relay 52.

The filter 26 includes a differentiator 60 which is connected to the inverter 24 through the output conductor 29, a differentiator 76 which is connected to the monostable multivibrator 22 through the conductor 27 and the conductor 31 leading from the point 33 on the conductor 27. The filter 26 further includes a monostable multivibrator 66 which is connected to the inverter 24 through the conductor 39 which leads from the point 41 on the conductor 35, and which conductor 35 leads from the point 37 on the output conductor 29 of the inverter 24.

The monostable multivibrator 66 is of a type similar to the monostable multivibrators 4 and 22 and is initially in its stable state. The pulse $\overline{E}_8$ from the inverter 24 triggers the monostable multivibrator 66 to its unstable state, with the arrangement being that monostable multivibrator 66 is triggered to its unstable state when the pulse $\overline{E}_8$ goes through a high to low transition as shown at time $T_4$ in FIGURE 2. The monostable multivibrator 66 remains in its unstable state for the time $T_4$ and $T_5$, and at the time $T_5$ monostable multivibrator 66 reverts to its stable state to provide at an output conductor 68 a pulse $E_9$ having a waveform as shown in FIGURE 2 and having a pulse width $D_3$ as determined by the interval $T_4$ to $T_5$.

The pulse $E_9$ is applied through the output conductor 68 to a monostable multivibrator 70. Monostable multivibrator 70 is of a type similar to the monostable multivibrator 66, being initially in its stable state and triggered by the pulse $E_9$ to its unstable state at the time $T_5$ shown in FIGURE 2. Monostable multivibrator 70 remains in its unstable state for the interval $T_5$ to $T_7$ to provide at an output conductor 72 and at the time $T_7$ the timing gate pulse $E_{10}$ having a pulse $D_4$ as determined by the interval $T_5$ to $T_7$.

The pulse $E_{10}$ from monostable multivibrator 70 is applied through the output conductor 72 to an inverter 69, and which inverter 69 provides at an output conductor 75 a complementary pulse $\overline{E}_{10}$ and having a waveform as shown in FIGURE 2. The pulse $\overline{E}_{10}$ is applied through the output conductor 75 to a set terminal 77 of a flip flop 74 and the pulse $E_{10}$ from the monostable multivibrator 70 is applied through the output conductor 72 and a conductor 76 joining the conductor 72 at a point 78 to a reset terminal 73 of the flip flop 74.

The flip flop 74 is of the type shown in block diagram form in FIG. 9–396 at page 343 of Pulse, Digital, and Switching Waveforms, Millman and Taub, McGraw-Hill, 1965, and has, in addition to the set terminal 77 and the reset terminal 73, a trigger terminal 75. As explained at pages 343 and 344 of the aforenoted reference, a flip flop such as the flip flop 74 has two stable states. The application of the pulse $\overline{E}_{10}$ to the set terminal 77 establishes the flip flop 74 in one of its stable states whereby an output at a high level is provided and the application of the pulse $\overline{E}_{10}$ to the reset terminal 73 establishes the flip flop 74 in the other of its stable states whereby an output at a low level is provided. A triggering pulse $E_{14}$ applied to the trigger terminal 75 of the flip flop 74 causes the flip flop 74 to charge its state regardless of the state that the flip flop 74 is in, and an output is provided at the output conductor 38 leading from the flip flop 74, which output corresponds to the input at the time the triggering pulse $E_{14}$ is applied.

The triggering pulse $E_{14}$ is provided by an AND gate 78 in response to the outputs from the differentiators 60 and 76 at the output conductors 67 and 71, respectively, and which outputs are provided, in turn, in response to the pulses $\overline{E}_8$ and $E_8$ from the inverter 24 and the monostable multivibrator 22, respectively.

The pulse $\overline{E}_8$ from the inverter 24 is applied through the conductor 29 to the differentiator 60, and which differentiator 60 provides at the output conductor 67 a pulse $\overline{E}_{12}$ having a waveform as shown in the graphical representation of FIGURE 2. The pulse $\overline{E}_{12}$ occurs at the transition times $T_4$ and $T_6$ of the pulse $\overline{E}_8$ as may be seen from FIGURE 2. The pulse $E_8$ from the monostable multivibrator 22 is applied through the conductor 27 to the conductor 31 leading from the point 33 on the conductor 27 to the differentiator 76, and which differentiator 76 provides at the output conductor 71 a pulse $E_{12}$ having a waveform as shown in the graphical representation of FIGURE 2 and which pulse $E_{12}$ occurs at the transition times $T_4$ and $T_6$ of the pulse $E_8$. The pulses $E_{12}$ and $\overline{E}_{12}$ are complementary to each other, as shown in FIGURE 2.

The pulse $\overline{E}_{12}$ from the differentiator 60 and the pulse $E_{12}$ from the differentiator 76 are applied through the conductors 67 and 71, respectively, to the AND gate 78, and which AND gate 78 provides at an output conductor 80 the negative going pulse $E_{14}$ having a waveform as shown in FIGURE 2 and occurring at the transition times $T_4$ and $T_6$ of the pulses $E_8$ and $\overline{E}_8$.

The negative going pulse $E_{14}$ acts as a clock pulse and is applied to the trigger input 75 of the flip flop 74 enabling the flip flop 74 to provide a pulse output during the transition times $T_4$ and $T_6$, at which time $T_4$ the pulse $\overline{E}_8$ goes through a high to low transition and at which time $T_6$ the pulse $\overline{E}_8$ goes through a low to high transition. The arrangement is such that at the time $T_4$, when the input at the reset terminal 73 is at a high level and when the input at the set terminal 77 is at a low level, the flip flop 74, triggered by the pulse $E_{14}$, provides a low output, and at the time $T_6$ when the input at the reset terminal 73 is at a low level and when the input at the set terminal 77 is at a high level, the flip flop 74, triggered by the pulse $E_{14}$ provides a high output. In other words, when the pulses $E_{10}$ and $\overline{E}_{10}$ are absent (time $T_4$), the output of filter 26 is low and when the pulses $E_{10}$ and $\overline{E}_{10}$ are present (time $T_6$) the output of filter 26 is high. The transition of the pulses $E_8$ and $\overline{E}_8$ at the times $T_4$ and $T_6$ thus causes the pulse $E_{14}$ to appear alternately during the time pulses $E_{10}$ and $\overline{E}_{10}$ are present and during the time said pulses are absent. The output of the flip flop 74 at the conductor 38, which output is the output of the filter 26, changes from high to low at the time $T_4$ and from low to high at the time $T_6$ to reproduce the waveform of pulse $\overline{E}_8$, with the reproduced waveform being shown as pulse $\overline{E}_8'$ in FIGURE 2.

The pulse $\overline{E}_8'$ is applied to the amplifier 40 and therefrom through the pulse transformer 44 and the rectifier 48 for energizing the relay 52 whereby the relay 52 actuates the alarm device 32 to an "off" condition.

The affect of the transition of the pulse $\overline{E}_8$ occurring outside of the gating pulse $E_{10}$ may best be illustrated with reference to FIGURES 3 and 4.

In FIGURE 3 the pulse $\overline{E}_8$ is shown to have an increased pulse width $D_2'$, and which increased pulse width $D_2'$ may be affected by the capacitor 18 being charged to the threshold level of the Schmitt Trigger 20 later than would otherwise be the case in response to the difference signal $E_5$ from the differential amplifier 12 being of a magnitude and polarity so as to indicate that the signals $e$ and $e_0$ differ in excess of a predetermined limit in one sense. In this event the transition of the pulse $\overline{E}_8$ may be seen to occur at times $T_4'$ and $T_6'$, and which times $T_4'$ and $T_6'$ occur outside of the range of the pulse $E_{10}$ as shown in FIGURE 3 and when the input to the flip flop 74 is at a constant level. The flip flop 74 is triggered by the pulse $E_{14}$ at the times $T_4'$ and $T_6'$ whereby the constant level input is switched to the output conductor 38 with said switched output being designated as $\overline{E}_8''$ in FIGURE 3. The pulse transformer 44 in FIGURE 1 is unresponsive to the constant level output $\overline{E}_8''$ whereby the relay 52 is de-energized and the alarm device 32 provides an "on" indications.

In FIGURE 4 the pulse $\overline{E}_8$ is shown to have a decreased pulse width $D_2''$ and which decreased pulse width $D_2''$ may be affected by the capacitor 18 being charged to the threshold level of the Schmitt trigger 20 sooner than would otherwise be the case in response to the difference signal $E_5$ from the differential amplifier 12 being of a magnitude and polarity so as to indicate that the signals $e$ and $e_0$ differ by more than a predetermined limit in another sense. In this latter event the transition of the pulse $\overline{E}_8$ may be seen to occur at the times $T_4''$ and $T''$, and which times $T_4''$ and $T_6''$ occur outside of the range of the pulse $E_{10}$ as shown in FIGURE 4 and when the input to the flip flop 74 is at the constant level. the flip flop 74 is at the constant level. The flip flop 74 is triggered by the pulse $E_{14}$ at the times $T_4''$ and $T_6''$ whereby the constant level input is switched to the output conductor 38, with said switched constant level input being designated by $\overline{E}_8''$ in FIGURE 4. The pulse transformer 44 in FIGURE 1 is unresponsive to the constant level output $E_8''$ whereby the relay 52 is de-energized and the alarm device 32 provides an "on" indication.

Figure 5:
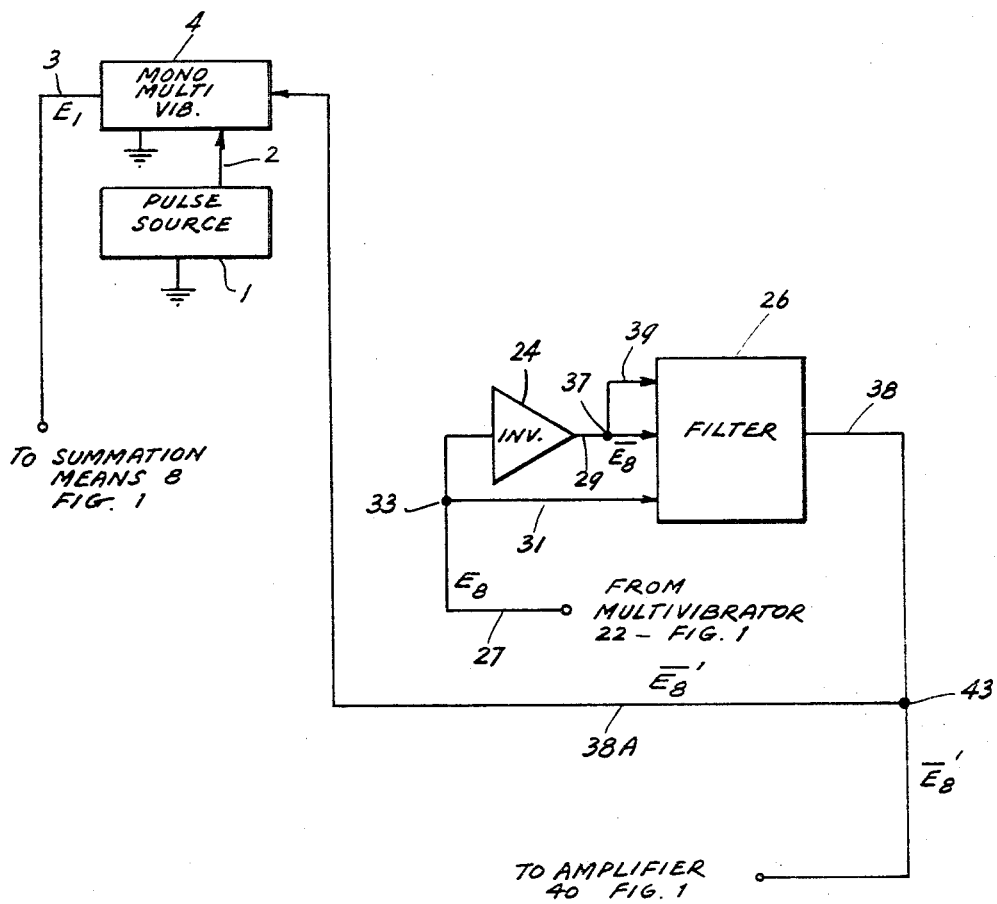
FIGURE 5 is an electrical schematic diagram showing an embodiment of the invention wherein the filter 26 is included in a feedback loop to sustain the operation of the monitor whereby the pulses $E_8$ and $\overline{E}_8$ go through a transition during the pulse $E_{10}$ until a monitor failure occurs.

With reference to FIGURE 5, there is shown an embodiment of the invention wherein the novel feature of the filter 26 in reproducing the pulse $\overline{E}_8$ when the input signals $e$ and $e_0$ correspond within the predetermined limits is employed to sustain the operation of the monitor whereby the transition of the pulses $E_8$ and $\overline{E}_8$ occurs during the pulse $E_{10}$, as heretofore noted. As shown in FIGURE 5, the filter 26 provides the output $\overline{E}_8'$ at the output conductor 38 and which pulse $\overline{E}_8'$ is applied to the amplifier 40 shown in FIGURE 1, and applied through the output conductor 38 and through a conductor 38$a$ joining the conductor 38 at a point 43 to the monostable multivibrator 4. When the $\overline{E}_8'$ is a reproduction of the pulse $\overline{E}_8$, the monostable multivibrator 4 is triggered to its unstable state at the time $T_6$ shown in FIGURE 2 whereby the monostable multivibrator provides at the output conductor 3 the pulse $E_1$ which is applied to summation means 8 shown in FIGURE 1 as heretofore noted. In the event that the output is $\overline{E}_8''$ at the constant level, the operation of the monitor is interrupted. Thus, in the embodiment of the invention shown in FIGURE 5 the filter 26 is included in the feedback loop of the monitor so that the pulse $E_8$ is provided as a function of the output of the filter 26 whereby the degree of fail safe performance of the monitor is improved.

OPERATION

The capacitor 18 is charged by the output of the differential amplifier 12, and which output corresponds to the difference between the signals $e$ and $e_0$ from the signal sources 7 and 9, respectively. When the redundant input signals $e$ and $e_0$ correspond within predetermined limits, the capacitor 18 will charge to the threshold level of the Schmitt trigger 20 during the interval $T_2$ to $T_4$ otherwise shown as $T_D$ and the Schmitt trigger 20 provides the pulse $E_7$ which is applied to the monostable multivibrator 22. The pulse $E_7$ triggers the monostable multivibrator 22 which provides the pulse $E_8$ having the pulse width $D_2$ as shown in FIGURE 2, and which pulse width $D_2$ is determined by the interval $T_6$ to $T_6$.

The pulse $E_8$ is applied to the differentiator 76 in the filter 26 and through an inverter 24 to the differentiator 60 in the filter 26, and which differentiators 60 and 76 provide the differentiated pulses $\overline{E}_{12}$ and $E_{12}$, respectively. The output of the differentiator 24 is applied to the monostable multivibrator 66 in the filter 26 and is also fed back to the monostable multivibrator 4 to sustain the oscillation of the monitor whereby the pulse $E_8$ having the pulse width $D_2$ is provided until a malfunction occurs.

The monostable multivibrator 66, in response to the output of the inverter 24 provides a pulse $E_9$ having a pulse width $D_3$ as determined by the interval $T_4$ to $T_5$, and which pulse $E_9$ triggers the monostable multivibrator 70 whereby the gating pulse $E_{10}$ having a pulse width $D_4$ as determined by the interval $T_5$ to $T_7$ is provided.

The pulse $E_{10}$ from the monostable multivibrator 70 is applied to the reset terminal 73 of the flip flop 74 and the complementary pulse $\overline{E}_{10}$ provided by the inverter 64 is applied to the set terminal 77 of the flip flop 74. The differential pulses $\overline{E}_{12}$ and $E_{12}$ from the differentiators 60 and 76 are applied to the AND gate 78 which responds to the differentiated pulses and provides at the times $T_4$ and $T_6$ shown in FIGURE 2 a triggering pulse $E_{14}$ for triggering the flip flop 74. The flip flop 74, triggered by the pulse $E_{14}$, provides an output corresponding to its input at the times $T_4$ and $T_6$, and which output is at alternate high and low levels reproducing the waveform of the pulse $\overline{E}_8$ provided by the inverter 24. The output of the flip flop 74 is applied to an amplifier 40 and therefrom through a pulse transformer 44 and a rectifier 48 for energizing a relay 52 whereby the alarm device 32 is actuated to an "off" state.

The pulse $\overline{E}_8$ is reproduced as long as the transition of the pulse $\overline{E}_8$ occurs during the pulse $E_{10}$ as may be seen with reference to FIGURE 2, and which event is occasioned by the signals $e$ and $e_0$ corresponding within predetermined limits as heretofore noted.

When the signals $e$ and $e_0$ differ so as to affect the charging time of the capacitor 18, whereby the capacitor 18 is charged to the threshold level of the Schmitt trigger 20 sooner or later than would otherwise be the case, the width of the pulse $E_8$ changes to $D_2'$ as determined by the interval $T_4'$ and $T_6'$ shown in FIGURE or $D_2''$ as determined by the interval $T_4''$ to $T_6''$ as shown in FIGURE 4. Thus, as may be seen with reference to FIGURES 3 and 4, when the capacitor 18 is so affected, the transition of the pulse $\overline{E}_8$ will occur at the times $T_4'$ and $T_6'$ or $T_4''$ and $T_6''$, and in which either event the transition occurs outside of the pulse $E_{10}$ and when the input to the flip flop 74 is at a constant level. The flip flop 74 is triggered by the pulse $E_{14}$ at the times $T_4'$ and $T_6'$ or at the times $T_4''$ and $T_6''$ whereby the flip flop 74 provides the output $\overline{E}_8''$ at a constant level and thus effectively blocks power to the relay 52 causing the alarm device 32 to be actuated to an "on" condition.

As heretofore noted, the output $\overline{E}_8'$ of the flip flop 74 provided at the output conductor 38 is a reproduction of the pulse $\overline{E}_8$ as long as the signals $e$ and $e_0$ correspond within predetermined limits. The embodiment of the invention shown in FIGURE 5 employs this novel feature wherein the filter 26 is included in the feedback loop of the monitor and the oscillation of the monitor at the predetermined frequency is sustained by the output $\overline{E}_8'$ at the output conductor 38 until a malfunction occurs. In this connection it is to be noted that when the embodiment of the invention shown in FIGURE 5 is employed the degree of fail safe performance of the monitor is considerably improved since the operation of the monitor is a function of the filter 26.

The monitor of the present invention is capable of operating on pulse data at low power levels, and thus facilitates the use of microcircuitry so that bulky space consuming components may be eliminated. The arrangement is such that the monitor is fail safe for all open and shorted circuit conditions internal to the filter 26.

What is claimed is:

1. A device for monitoring a control system providing redundant electrical signals, comprising:
   first means for providing a first pulse;
   summation means connected to the first means for summing the first pulse and one of the redundant input signals and for providing a summation signal;
   comparator means for comparing the summation signal with another redundant input signal and for providing a signal corresponding to the difference therebetween;
   second means connected to the comparator means and affected by the difference signal therefrom for providing a triggering pulse;
   third means connected to the second means and responsive to the triggering pulse for providing a second pulse;
   fourth means connected to the third means and responsive to the second pulse for providing a third pulse;
   fifth means connected to the fourth means and responsive to the third pulse for providing a fourth pulse, and for providing a first controlling output when the difference between the summation signal and the other redundant signal is within predetermined limits and a second controlling output when said difference exceeds the predetermined limits; and
   indicating means connected to the fifth means and responsive to the first controlling output for providing an off indication and responsive to the second controlling output for providing an on indication.

2. A device as described by claim 1, wherein the fifth means provides the first controlling output when the third pulse provided by the fourth means goes through a transition from one logic level to another during the fourth pulse and provides the second controlling output when the third pulse goes through said transition outside of the fourth pulse.

3. A device as described by claim 1, wherein the first controlling output is at alternate high and low levels so as to correspond to the complement of the third pulse.

4. A device as described by claim 1, wherein the second controlling output is a constant level output.

5. A device as described by claim 1, wherein:
   a first inverter is connected to the fourth means for providing a fifth pulse complementary to the third pulse provided by said fourth means; and
   the fifth means provides the fourth pulse and the first and second controlling outputs in response to the third pulse and the complementary fifth pulse.

6. A device as described by claim 1, wherein:
   the third means provides the second pulse when the triggering pulse provided by the second means is at a predetermined threshold level; and
   the second means includes a capacitor which is charged to the threshold level during a predetermined interval when the difference between the summation signal and the other redundant signal is within the predetermined limits and is charged to said threshold level during an interval other than the predetermined interval when said difference exceeds the predetermined limits.

7. A device as described by claim 5, wherein the first means includes:
   means for providing a starting pulse;
   means connected to the means for providing a starting pulse for providing the first pulse in response to said starting pulse; and
   said last mentioned means being connected to the first inverter and responsive to the complementary fifth pulse for repeating the first pulse.

8. A device as described by claim 5, wherein the first means includes:
   means for providing a starting pulse;
   means connected to the means for providing a starting pulse for providing the first pulse in response to said starting pulse; and
   said last mentioned means being connected to the fifth means and responsive to the first controlling output for repeating the first pulse.

9. A device as described by claim 5 wherein the fifth means comprises:
   a first multivibrator connected to the first inverter for providing a sixth pulse in response to the complementary fifth pulse;
   a second multivibrator connected to the first multivibrator for providing a seventh pulse in response to the sixth pulse;
   a second inverter connected to the second multivibrator for providing an eighth pulse complementary to the seventh pulse;
   first differentiating means connected to the fourth means for providing a first differentiated pulse in response to the third pulse;
   second differentiating means connected to the first inverter for providing a second differentiated pulse in response to the complementary fifth pulse;
   gating means connected to the first and second differentiators and responsive to the first and second differentiated pulses for providing a triggering pulse;
   means connected to the gating means, the second multivibrator and the second inverter and responsive to the triggering pulse, the seventh pulse and the eighth complementary pulse for providing the first and second controlling outputs.

10. A device as defined by claim 9, wherein the last mentioned means comprises:
    a flip flop having a set terminal, a reset terminal and a triggering terminal;
    the second multivibrator is connected to the reset terminal;
    the second inverter is connected to the set terminal;
    the gating means is connected to the triggering terminal so that the last mentioned means is triggered by the triggering pulse for providing the first controlling output at alternate high and low levels in response to the seventh pulse and the complementary eighth pulse when the difference between the summation signal and the other redundant signal is within the predetermined limits whereby the third pulse and the complementary fifth pulse go through a transition from one logic level to another during the seventh pulse, with said first controlling output being a reproduction of the complementary fifth pulse; and
    the last mentioned means being triggered by the triggering pulse for providing the second controlling output at a constant level in response to the seventh pulse and the complementary eighth pulse when the difference between the summation signal and the other redundant signal is within the predetermined limits whereby the third pulse and the complementary fifth pulse go through said transition outside of the seventh pulse.

References Cited

UNITED STATES PATENTS 2,713,674   7/1953   Schmitt _____ 340—67

JOHN W. CALDWELL, Primary Examiner

HAROLD I. PITTS, Assistant Examiner

U.S. Cl. X.R.

340—147, 149, 164, 213